April 21, 1942.    D. C. WARE    2,280,327
GROUNDING DEVICE FOR VEHICLES
Filed Jan. 29, 1940
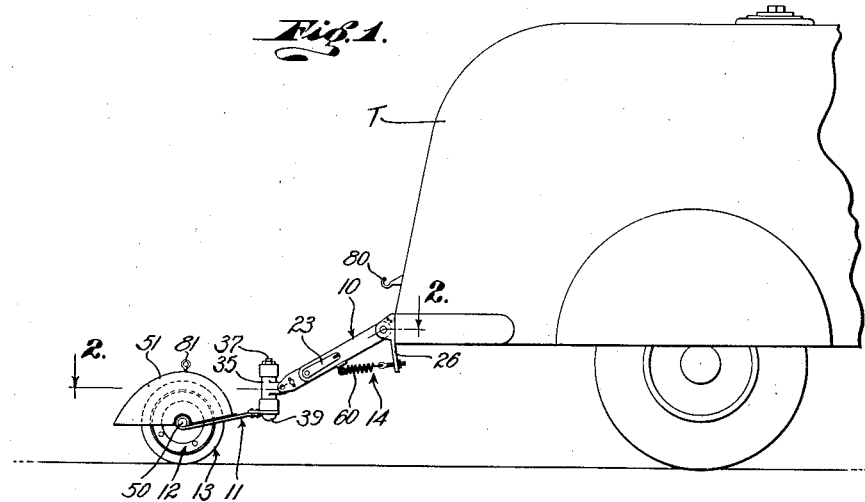
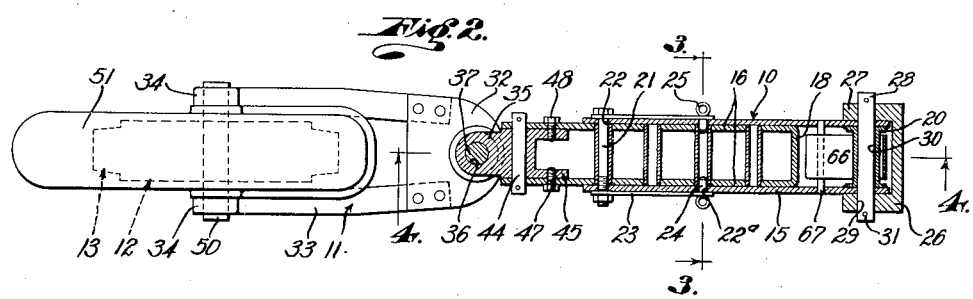
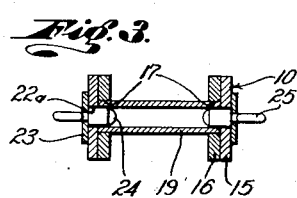
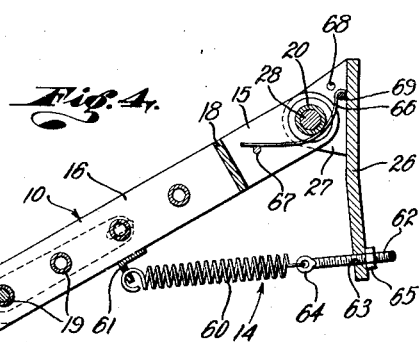
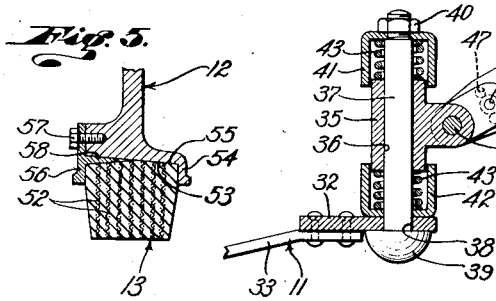
Inventor.
DAVID CURTIS WARE
By
His Attorney Patented Apr. 21, 1942

2,280,327

UNITED STATES PATENT OFFICE 2,280,327

GROUNDING DEVICE FOR VEHICLES

David Curtis Ware, Laguna Beach, Calif.

Application January 29, 1940, Serial No. 316,183

8 Claims. (Cl. 175—264)

This invention relates to a device for grounding vehicles and relates more particularly to a static grounding device for rubber-tired tank trucks and the like conveying inflammable fluids, explosives, etc. A general object of this invention is to provide a quiet, dependable and long wearing vehicle grounding device of the character mentioned.

Tank trucks used to transport gasoline and other inflammable and explosive products are usually equipped with a grounding attachment to carry away the electricity generated by the agitation of the liquid in the metal tanks. Such grounding devices are essential on all rubber-tired tank trucks carrying explosives or highly inflammable fluids as the discharge of the static electricity in the tanks may result in an explosion. The grounding device now most generally used consists of a length of chain suspended from the rear of the truck to drag along the road and thus carry off the static electricity. The lower links of the chain, or the blade sometimes attached to the chain, wear away rapidly and there is always the hazard that the chain will not be replaced or lowered to again contact the ground, before a dangerous static charge builds up in the truck. The chain links striking the road surface produce a great many sparks and fluid leaking from the truck may be ignited by these sparks and cause burning or explosion of the truck and its contents. Further, the chain dragging along the road produces a loud and very disagreeable noise and for this reason certain communities have prohibited the travel of tank trucks on their roads when equipped with such grounding chains.

Another object of this invention is to provide a grounding attachment for a tank truck or the like that is long wearing and that remains effective indefinitely.

Another object of this invention is to provide a grounding attachment of the character mentioned that is practically noiseless.

Another object of this invention is to provide a grounding attachment for a vehicle that automatically adjusts itself to different load conditions of the vehicle.

Another object of this invention is to provide a grounding attachment of the character mentioned that may be readily manually adjusted to adapt it for use on vehicles of different types, heights, etc.

Another object of this invention is to provide a grounding attachment embodying a novel grounding wheel adapted to run along the road in trailing relation to the truck and mounted in such a manner that it may caster in response to all changes in direction of movement of the truck.

Another object of this invention is to provide a grounding attachment of the character mentioned embodying a novel tire for the grounding wheel formed of rubber, or the like, to be noiseless and long wearing, and embodying embedded electrical conducting parts for contacting the road surface to carry away the static electricity.

Another object of this invention is to provide a grounding attachment of the character mentioned embodying dependable and efficient spring means for maintaining the road contacting conducting wheel in cooperation with the road, which means is adjustable as conditions may require.

A further object of this invention is to provide a grounding attachment of the character mentioned that may be readily folded or retracted to form a small, compact unit clear of the ground.

The various objects and features of my invention will be fully understood from the following detailed description of a typical preferred form and application of the invention, throughout which description reference is made to the accompanying drawing, in which:

Fig. 1 is a side elevation of the rear portion of a typical tank truck showing the grounding attachment of the present invention in its operative position on the truck. Fig. 2 is an enlarged detailed sectional view taken substantially as indicated by line 2—2 on Fig. 1 showing the fork and wheel in plain view. Fig. 3 is an enlarged vertical detailed sectional view taken as indicated by line 3—3 on Fig. 2. Fig. 4 is a fragmentary vertical detailed sectional view taken as indicated by line 4—4 on Fig. 2, with certain parts in side elevation, and Fig. 5 is a fragmentary detailed sectional view of the wheel and its tire.

The device of the present invention may be attached to vehicles of various types and to vehicles carrying different products, it being a feature of the invention that the device is adaptable for use on practically all classes of vehicles. In the drawing I have shown the device applied to the back of a truck T of the type employed to carry gasoline, etc., it being understood that the invention is not to be construed as limited or restricted to the particular form or application about to be described.

The improved grounding device of the invention may be said to comprise, generally, a foldable and longitudinally extensible arm 10 to be pivotally secured to the truck T, a fork 11 pivotally carried by the arm 10, a rotatable conducting wheel 12 carried by the fork 11, a resilient conducting tire 13 on the wheel 12, and regulable spring means 14 acting on the arm 10 to yieldingly maintain the tire 13 of the wheel in engagement with the road surface.

The arm 10 is an elongate structure intended to be secured to the rear of the truck T to extend downwardly and rearwardly therefrom and to swing or pivot about a substantially horizontal axis. In accordance with the invention the arm 10 is formed to be foldable and to be longitudinally extensible and contractible to adapt the device for use on trucks varying greatly in height and type. In the construction illustrated the arm 10 comprises two spaced substantially parallel outer members 15 and two spaced inner members 16. As shown, the arm members 15 and 16 are elongate flat parts. The inner members 16 slidably bear on the inner surfaces of the outer members and have longitudinally spaced openings 17. Tubular ferrules 19 are suitably set or secured in the openings 17. The upper ends of the inner members 15 may be connected by an integral transverse web 18 so that the members move in unison. The inner members 16 are proportioned to extend outwardly or rearwardly beyond the outer members 15. The upper ends of the outer arm members 15 are connected by a tubular ferrule or spacer 20.

The invention provides novel means for securing or locking the inner arm members 16 in the selected adjusted positions relative to the outer members 15 and for connecting the pairs of members for relative pivoting. Each outer member 15 has a transverse opening 22 for registering with a ferrule 19. Leaf springs 23 are arranged at the outer sides of the members 15 and are tied together and held in place by a bolt 21 passed through the openings 22 and the registering ferrule 19. The outer or free ends of the springs 23 carry inwardly projecting pins 24. The pins 24 extend through openings 22ᵃ in the members 15 and are of sufficient length to extend into selected ferrules 19 of the inner members 16. Handles or knobs 25 are provided on the springs 23 so that the pins 24 may be readily withdrawn from the ferrules 19. When the pins 24 are withdrawn from the ferrules 21 the members 16 may be pivoted relative to the members 15 about the axis of the bolt 21 to permit folding of the device as will be later described. To extend or contract the arm 10 the bolt 21 is removed and the members 16 are shifted longitudinally relative to the members 15. The members 16 may be moved to bring a selected ferrule 19 into registration with the openings 22 whereupon the bolt 21 is replaced and the springs 23 are allowed to move the pins 24 into the ferrule 19. With the bolt 21 replaced and the pins 24 entered in the ferrule 19 the members 16 are effectively locked or latched against movement relative to the members 15.

Bracket means is provided to attach the arm 10 to the truck T so that the arm may project downwardly and rearwardly from the truck and may swing about a substantially horizontal axis. A bracket 26 is suitably fixed to the rear portion of the truck T to be in contact with a metal part or conducting part of the truck. Spaced ears 27 project rearwardly from the body of the bracket 26 and the upper portions of the arm members 15 enter between the ears. A pivot pin 28 is passed through horizontal openings 29 in the ears 27 and a horizontal opening 30 in the upper portion of the arm 10 to pivotally attach the arm to the bracket 26. Suitable pins or keys 31 may hold the pin 28 against displacement. It will be seen that the arm 10 secured to the truck T by the bracket means may freely swing about a substantially horizontal axis and may normally extend downwardly and rearwardly from the truck.

The fork 11 serves to carry or mount the ground wheel 12 and is pivotally attached to the outer end of the arm 10 so that the wheel may swing or caster in response to changes in direction of movement of the truck T. As illustrated the fork 11 may comprise a tongue 32 formed of plate stock, or the like, and spaced rearwardly extending spring arms 33. The spring arms 33 are suitably replaceably attached to the tongue 32. The rear portions of the arms 33 are curled or rolled to form aligned substantially horizontal bearings 34.

The invention provides novel adjustable means for attaching the fork 11 to the arm 10 to swing or pivot about a substantially vertical axis. This means includes a bearing block 35 having a substantially vertical opening 36 passing a king pin 37. The pin 37 extends downwardly from the block 35 to pass through an opening 38 in the fork tongue 32 and has a head 39 on its lower end engaging the under surface of the tongue. It is preferred to provide the pivotal mounting of the wheel fork 11 with shock absorbing means. A nut 40 is threaded on a reduced upper portion of the pin 37 and a cup 41 is clamped under the nut 40 to telescope downwardly over the upper portion of the block 35. A similar cup 42 is arranged on the pin 37 to engage against the fork tongue 32 and to telescope upwardly over the lower portion of the block 35. Coiled compression springs 43 are housed in the cups 41 and 42 to bear between the end walls of the cups and the ends of the bearing block 35. The springs 43 yieldingly resist vertical shifting of the pin 37 and the fork 11 relative to the block 35.

The bearing block 35 is adjustably secured to the outer end of the arm 10 in such a manner that the pin 37 may be brought to a substantially vertical position with the arm 10 adjusted to different angular positions as required by the attachment of the device to trucks of different types and heights. The means for adjustably securing the block 35 to the arm 10 includes a horizontal pin 44 arranged through registering openings in the outer ends of the members 16 and the block 35. The pin 44 connects the block 35 with the arm 10 for adjustment or pivotal movement about a substantially horizontal axis. Radial flanges 45 project from the block 35 and lie against the inner sides of the arm members 16, and each flange has a threaded transverse opening 46. An arcuate series of transverse openings 47 is provided in each arm member 16. The openings 47 are arranged in concentric relation to the axis of the pin 44 and are positioned to successively come into registration with the openings 46. Screws 48 are adapted to be passed through corresponding selected openings 47 to be threaded into the openings 46. The bearing block 35 may be pivoted or adjusted relative to the arm 10 to bring the pin 37 to a substantially vertical position, and the screws 48 may then be passed through the openings 47 and threaded into the openings 46 to secure the block in its adjusted position.

The wheel 12 is rotatably supported in the fork 11 to be in trailing relation to the truck and to have its tire 13 contact the road surface. The wheel 12 is preferably a metal structure to effectively conduct electricity and is supported in the fork 11 to be in electrical conducting relation thereto. An axle 50 rotatably carries the wheel 12 and has its end portions received in the bearings 34 of the fork 11. The wheel 12 may, of course, be provided with suitable anti-friction bearings and the bearings when employed are such that electricity is readily conducted from the axle 50 to the wheel. A suitable mud guard or fender 51 may be provided on the fork 11 to extend over the upper portion of the wheel 12. It will be observed that the axis of rotation of the wheel 12 is offset rearwardly from the axis of the pivot pin 37 so that the wheel may readily caster about the axis of the pin.

The tire 13 of the wheel 12 forms the earth or road engaging element of the grounding device and is of novel construction to assure the full and effective dissipation of the static electricity that may be generated in the truck T. The tire 13 is an annular member formed of rubber, rubber composition, synthetic rubber, or the like, with or without fabric reinforcement. The tire 13 preferably has a wide flat tread so that it will not catch or wipe in railway tracks and the like. It is a feature of the invention that the tire 13 embodies electrical conducting elements. Metal screening is cast or embedded in the tire 13 to be exposed at the internal surface and the external periphery of the tire. There may be several disc-like layers of metal screening elements 52 provided in the tire 13 to have their edges at the inner and outer surfaces of the tire. The wheel 12 is provided with a pitched periphery 53 and a radial annular flange 54 at the high end of its peripheral surface. The inner side of the tire 13 is provided with two outwardly diverging surfaces 55 and one surface 55 is adapted to contact the wheel surface 53. This brings one or more of the wire screening elements 52 in metal to metal contact with the wheel 12. A detachable rim flange 56 is provided to hold the tire 13 on the wheel 12. The flange 56 may be held against a side of the wheel 12 by screws 57. The inner side of the detachable rim flange 56 has a tapered annular lip 58 for engaging one of the sloping surfaces 55 of the tire 13. Certain of the metal screen elements 52 have direct metal to metal contact with the lip 58. It will be seen that the yielding or resilient tire 13 may operate or roll along roads surfaced in various manners with little or no sound, and that the metal screening elements 52 of the tire maintain the grounding device in electrical contact with the earth at all times.

The means 14 serves to urge the arm 12 downwardly to yieldingly hold the tire 13 of the wheel 12 in cooperation with the road surface. The spring means 14 includes an extensible tension spring 60 anchored to the bracket 26 and connected with the arm 10. The outer end of the spring 60 may be suitably hooked through a flange or clip 61 provided on the under side of the arm 10. An anchor screw 62 passes forwardly through an opening 63 in the lower portion of the bracket 26 and has an eye 64 on its forward end receiving the rear part of the spring 60. An adjusting nut 65 is provided to permit longitudinal adjustment of the screw 62. By adjusting the screw 62 the tension on the spring 60 may be varied to provide the desired or required downward force on the arm 10. The spring means 14 may further include a leaf spring 66 engaged between the bracket 26 and the arm 10 to assist the spring 60 in urging the arm downwardly. The spring 66 engages under the spacer 20 and its forward end bears downwardly against a pin 67 suitably secured to the arm members 15. Arcuate series of openings 68 are provided in the bracket ears 27 and a pin 69 may be arranged in selected pairs or sets of aligned openings 68. The upper portion of the spring 66 is engaged over the pin 69. By arranging the pin 69 in different openings 68 the spring 66 may be adjusted to urge the arm 10 downwardly, as required.

The several parts of the grounding device, with the exception of the tire 13, are formed of electrical conducting material such as iron or steel, and the bracket 26 is secured to a frame part or grounding part of the truck T so that static electricity that may be generated in the truck flows through the grounding device. As above described, the metal screening elements 52 of the tire 13 carry this electricity to the earth or road surface.

In using the device the bracket 26 is suitably secured to the truck so that the arm 10 may project downwardly and rearwardly. The arm 10 may be extended or contracted to adapt the device for use on trucks of different types or heights. With the device secured to the truck T and the arm 10 adjusted as found necessary, it may be found desirable to adjust the bearing block 35 to bring the pin 37 to a more vertical position. This is done, as described above, by removing the screws 48 and pivoting the block 35 about the pin 44 to the correct or selected position. The screws 48 are replaced to secure the block 35 in the adjusted position. The screw 62 may be adjusted to give the spring 60 the desired action and, if necessary, the pin 69 may be adjusted to vary the action of the spring 66. It will be seen that the device is fully adjustable to adapt it for practically any operating conditions.

When the truck T is in operation the wheel 12 rolls along the road in trailing relation to the truck and its tire 13 contacts the road surface. Any static electricity that may be generated in the truck T is conducted through the device to the wheel 12 and the metal screening elements 52 carry the electricity to ground. The wheel carrying fork 11 is supported to pivot on the pin 37 so that the wheel 12 may swing or caster in response to changes in direction of movement of the truck and the fork arms 33 may flex when the wheel runs on uneven pavement, etc. The arm 10 is pivotally supported by the pin 28 so that the entire device may pivot relative to the truck when the truck travels over uneven ground, etc., and the pivoted arm 10 automatically conditions the device for different load conditions of the truck.

When the grounding device is not required or when it is desired to back the truck T into a confined space the grounding device may be folded into a compact unit at the back of the truck. This may be done by freeing or disconnecting the springs 60 and 66 and then retracting the pins 24 from the ferrule 19 so that the fork and the arm members 16 may be pivoted upwardly. This upward pivoting of the members 16 and the fork 10 brings the wheel 12 to a position adjacent the back of the truck T and the raised parts may be suitably hooked or secured in the elevated position where they are clear of the ground and in close relation to the truck back.

I have shown a hook 80 on the truck T for engaging in an eye 81 on the fender 51 to retain the device in its folded position.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A grounding device for a vehicle comprising an arm member, means for securing the member to the vehicle to extend downwardly and rearwardly therefrom and to pivot about a horizontal axis, a bearing on the rear end of the member, a ground engaging conducting wheel, a fork rotatably mounting the wheel and carried by the bearing to swing about a generally vertical axis, and means for adjusting the bearing about a substantially horizontal axis so that the axis of swinging of the fork may be made substantially vertical with the member at different angles.

2. A grounding device for a vehicle comprising an arm member, means for securing the member to the vehicle to extend downwardly and rearwardly therefrom and to pivot about a horizontal axis, a ground engaging conducting wheel, a fork rotatably mounting the wheel, bearing means connecting the fork with the arm member to swing about a generally vertical axis, and shock absorbing means associated with the bearing means.

3. A static grounding device for a vehicle comprising a bracket attachable to the vehicle, an extensible and contractible arm secured to the bracket to extend rearwardly and downwardly therefrom and to swing about a substantially horizontal axis, a ground engaging conducting wheel, a member rotatably mounting the wheel, a bearing pivotally supporting said member and secured to the arm for adjustment with respect thereto whereby the member may be made to swing about a generally vertical axis with the arm in different angular positions, means for securing the bearing in selected adjusted positions, and releasable means for holding the arm against elongation and contraction when adjusted to the desired length.

4. A grounding device for a vehicle comprising a structure attachable to the vehicle to extend therefrom and to be in electrical conducting relation thereto, a conducting wheel in electrical conducting relation to the structure supported by the structure to rotate, an annular resilient tire on the wheel for running on the road surface, and a plurality of axially spaced discs of wire mesh embedded in the tire to have their inner edges exposed at the interior of the tire to contact the wheel and to have their peripheries exposed at the periphery of the tire to be in electrical contact with the road.

5. A grounding device for a vehicle comprising a structure attachable to the vehicle to extend therefrom and to be in electrical conducting relation thereto, a conducting wheel in electrical conducting relation to the structure supported by the structure to rotate, a resilient tire on the wheel for running on the road surface, a detachable rim flange on the wheel retaining the tire on the wheel, and a disc element of metal screening occupying a generally radial plane in the tire and exposed at the interior of the tire to contact the wheel and exposed at the periphery of the tire to be in electrical contact with the road.

6. A static grounding device for a vehicle comprising a bracket attachable to the vehicle, an extensible and contractible arm secured to the bracket to extend rearwardly and downwardly therefrom and to swing about a substantially horizontal axis, a ground engaging conducting wheel, a member rotatably mounting the wheel, a block swingably supporting the member, and means adjustably mounting the block on the arm whereby the axis of swinging of the member may be made substantially vertical with the arm in different angular positions, said means including a pin supporting the block on the arm for pivoting about a substantially horizontal axis, and means for holding the block against pivoting in any one of a plurality of different positions.

7. A static grounding device for a vehicle comprising a bracket attachable to the vehicle, an arm having its upper end pivotally supported by the bracket to swing about a horizontal axis, the arm including two members related for relative pivotal movement about a transverse axis whereby the arm is foldable, releasable means for holding the members against relative pivoting when the arm is in the operative position, a road contacting conducting wheel, a carrier rotatably supporting the wheel, and means mounting the carrier on the lower end of the arm to pivot about a generally vertical axis.

8. A static grounding device for a vehicle comprising a bracket attachable to the vehicle, an arm pivotally supported from its upper end on the bracket to swing about a horizontal axis, the arm including two members related for relative pivotal movement about a transverse axis whereby the arm is foldable, releasable means for holding the members against relative pivoting when the arm is in the operative position, a road contacting conducting wheel, a carrier rotatably supporting the wheel and carried by the arm to pivot about a generally vertical axis, and means for holding the device elevated when the arm is folded.

D. CURTIS WARE.